United States Patent [19]

Zemanek

[11] 4,282,600
[45] Aug. 4, 1981

[54] METHOD FOR SYNCHRONIZING SENDING AND RECEIVING DEVICES

[75] Inventor: Josef Zemanek, Munich, Fed. Rep. of Germany

[73] Assignee: Siemens Aktiengesellschaft, Berlin & Munich, Fed. Rep. of Germany

[21] Appl. No.: 73,900

[22] Filed: Sep. 10, 1979

[30] Foreign Application Priority Data

Sep. 28, 1978 [DE] Fed. Rep. of Germany ....... 2842371

[51] Int. Cl.³ .......................... H04J 3/06; H04L 7/00
[52] U.S. Cl. ..................................... 370/100; 370/47; 375/113
[58] Field of Search .......................... 370/100, 47, 48; 375/113, 116, 117

[56] References Cited

U.S. PATENT DOCUMENTS

| | | |
|---|---|---|
| 3,603,735 | 9/1971 | Cleobury ............................. 375/116 |
| 3,689,846 | 9/1972 | Naeyaert ............................. 375/117 |
| 4,130,724 | 12/1978 | Bousmar et al. ..................... 375/116 |

*Primary Examiner*—Douglas W. Olms
*Attorney, Agent, or Firm*—Hill, Van Santen, Steadman, Chiara & Simpson

[57] ABSTRACT

A method for the synchronizing of sending and receiving devices in a PCM telecommunication network employs a counter which is reset by each bit representative of a binary 1 in the received message and which produces a signal for enabling the synchronizing device when it reaches its end count. The counter is incremented by clock pulses produced at the receiving station, and the radix of the counter is selected to exceed the number of bits representative of binary "0"s which can appear consecutively within the message, and the time required for the counter to reach its end count is almost as long as the pause between successive message words.

3 Claims, 2 Drawing Figures

METHOD FOR SYNCHRONIZING SENDING AND RECEIVING DEVICES

FIELD OF THE INVENTION

The present invention relates to a method of synchronizing sending and receiving devices, and in particular the digital subscriber stations of a PCM telecommunication network.

THE PRIOR ART

In PCM telecommunication networks, typically a transmission line is used alternately for signal transmission in both transmission directions. A synchronizing word precedes each message, and typically comprises a bit of the binary value 1 followed by a binary 0, or a binary 1. The synchronizing word therefore typically incorporates two bits.

Because the bit combinations for the synchronizing word may also occur during the message, an erroneous synchronization can take place as the result of such bit combinations lying within the message signal block. Although such faulty synchronization may be recognized and corrected with following checks, the need for such checks leads to a significant delay in attaining correct synchronization.

In the case of a system illustrated and described in German patent application Ser. No. P 28 35 605.0, such erroneous synchronizations are avoided by employing signal states for binary 1's and 0's which are unambiguously distinguished from the idle condition, and by employing a synchronization signal which unambiguously gives the synchronization data and the length of a message signal block, so that only the synchronizing word appearing at the beginning of a message signal is used for synchronization.

When the so-called AMI code (alternate mark inversion) is used, a binary value of 1 is indicated by pulses with positive and negative voltage, and a binary value 0 is provided by a zero voltage. In such a case, the system described in the aforementioned German patent application is not useful.

BRIEF SUMMARY OF THE INVENTION

It is accordingly a principal object of the present invention to provide a method for attaining a secure synchronization as rapidly as possible.

In accordance with one embodiment of the invention, the synchronization is obtained by employing a counter which is reset by each received bit of the binary value displayed by the first bit of the synchronizing word, and recognizing synchronizing words only when the counter has been counted to a state corresponding to at least the sum of the bit time intervals in which the bits of the other binary value can appear during the message.

In the case of the so-called HDB3 code, it is guaranteed that there are no more than three bits of binary value 0 which can occur in succession. Thus, if the predetermined count of the counter corresponds to a longer time interval than three bit time periods, the counter, which is reset by each "1" bit of a message signal during a message transmission will not be able to reach its end count during the period of the message. The end count is attained only in the pause between the receiving of two message signal blocks, so that a new synchronization can proceed only as the result of a synchronizing word at the beginning of the following message signal block.

In accordance with another feature of the present invention, the synchronization process can take place when the counter has reached a state which corresponds to a time span almost as long as the space between two message signal blocks. This insures that noise which takes place in the space between two message signal blocks cannot lead to a false synchronization.

BRIEF DESCRIPTION OF THE DRAWINGS

Reference will now be made to the accompanying drawings in which.

DESCRIPTION OF THE PREFERRED EMBODIMENT

Figure 1:
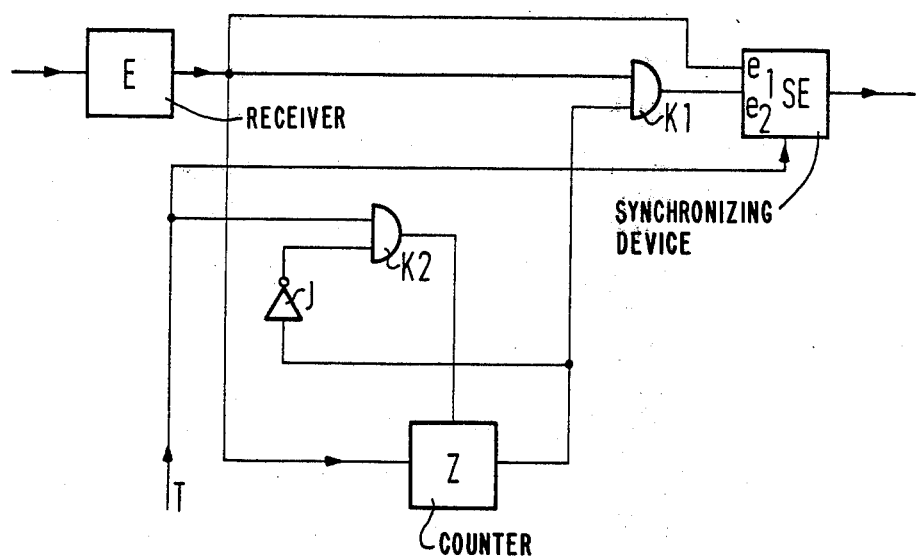
FIG. 1 is a functional block diagram illustrating a preferred embodiment of the present invention.

Referring now to FIG. 1, a receiver E is provided for receiving message signal blocks, within which a synchronizing word is present. A synchronizing device SE receives, via its input e2, the bits of the synchronizing word, and as soon as the synchronizing word is received, produces an output which determines the time relationships within the receiving apparatus. Following the synchronization phase, the synchronizing device SE monitors the arriving message signal flow by way of its input e1.

A counter Z is provided which is advanced in stepwise fashion by pulses T, from the clock pulse generator of the receiving station. These pulses are applied to one input of a gate K2, the output of which is connected to the counting input of the counter Z. The counter Z has a reset input which is connected to the output of the receiver E, with the result that the counter Z is reset for each bit of binary value 1 which appears in the message signal flow being received. Thus, when bits representative of binary 1's are closely spaced within the message being received, the counter Z cannot attain its end count. If, however, no bit representative of binary 1 occurs for a predetermined period, the pulses T cause the counter Z to reach its end count, at which time the counter Z produces an output signal which is connected to the gate K1. This enables the gate K1 to pass message signals from the receiver E to the input e2 of the synchronizer unit SE.

The output of the counter Z is also passed through an inverter J to one input of the gate K2, so that when the counter Z has reached its end count, the gate K2 is disabled, and the counter Z remains in that state until reset by a subsequent bit representative of a binary 1 from the receiver E.

The radix of the counter Z is chosen so that its end count is not reached until after at least as many bit time spaces as there may be consecutive bits representative of binary 0, in the code being used. Alternatively, the radix of the counter may be selected to correspond to almost the length of the pause between consecutive message signal blocks received by the receiver E.

Figure 2:
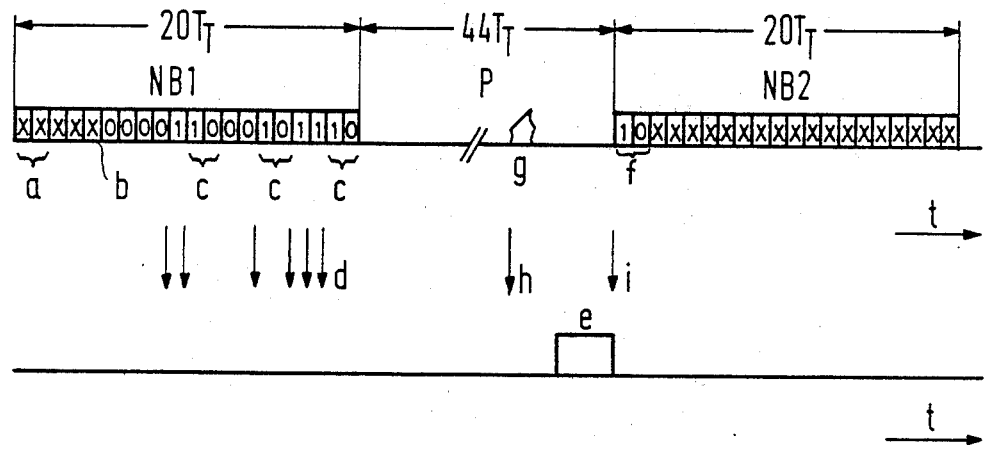
FIG. 2 illustrates a time diagram useful in explaining the present invention.

FIG. 2 shows in its upper line two message signal blocks NB1 and NB2, each having twenty bits, of which the first two form the synchronizing word. A two-bit signalling word follows the synchronizing word, and two eight-bit message signal words follow the signalling word. There is a pause P between the two message signal blocks NB1 and NB2, and various operations can take place during this pause.

The first message signal block NB1 has a number of bits representative of binary 1, following time b when synchronization is achieved, as the result of the synchronizing word a taking up the first two bits of the word. Were it not for the present invention, false synchronization could take place as the result of recognition of the 1-0 combinations C which appear during the body of the message. However, in accordance with the present invention, each bit representative of a binary 1 within the message, causes the resetting of the counter Z, at times indicated by the arrows d. Thus, the counter Z is prevented from reaching its end count during the period of the message. As illustrated in FIG. 2, the last bit representative of a binary 1 occurs near the end of the word NB1, with the result that the counter Z cannot achieve its final count until near the end of the pause P, provided an interference g does not occur. The attainment of the final count is illustrated in FIG. 2 by the signal e, which is the output signal produced by the counter. Because the output e is high at the beginning of the second message signal block NB2, synchronization is effected for the second signal block.

Because of the blocking of the AND-gate K2, the counter Z is not further counted during the pause P, but is reset when the first bit of the synchronizing word f is recognized. This terminates the signal e (FIG. 2) so that synchronization does not occur again until the beginning of the following message signal block.

If a noise pulse g occurs during the pause P, this also results in resetting the counter Z, so that the end count of the counter is not yet attained when the correct synchronizing word appears at the beginning of the second message signal block. Accordingly, a new synchronization cannot occur until the beginning of the following message signal block. Since the appearance of noise pulses is quite significantly less frequent than the occurence of the 10-sequences in the message signal blocks, there is little loss in information, and false synchronization due to the noise pulses is positively prevented.

Following each synchronization, during the reception of the message signal block, the synchronizing device SE monitors the message signal bit flow, so that the synchronizing device SE is able to use the signals arriving from the receiver E for synchronization purposes, when the expected synchronizing word bit combination does not occur at the expected time.

From the foregoing, it can be seen that the present invention provides a simple and effective method of assuring synchronization only in response to synchronizing words occurring at the beginning of a message signal block. It will be apparent that various additions and modifications may be made in the method of the present invention without departing from the essential features of novelty thereof, which are intended to be defined and secured by the appended claims.

I claim:

1. A method for synchronizing sending and receiving devices of a PCM telecommunication network, employing synchronizing words contained within spaced message signal blocks, comprising the steps of;

counting a plurality of clock pulses produced at the receiving unit with a counter, resetting the counter to its initial position upon receipt of each bit corresponding to the first bit of a synchronizing word, effecting a synchronization upon receipt of the first such bit following the counter reaching its end count, and preventing further counting of the counter when it reaches its end count, until a bit is received corresponding to the first bit of a synchronizing word.

2. The method according to claim 1, including the step of selecting an end count for said counter so that the time required for said counter to reach its end count corresponds to a time interval one bit less than the pause between consecutive ones of said spaced message signal blocks.

3. The method according to claim 1, wherein the first part of each of said message signal blocks contains said synchronizing word.

* * * * *